(12) United States Patent
Delfs et al.

(10) Patent No.: US 6,826,404 B2
(45) Date of Patent: Nov. 30, 2004

(54) TONE SIGNALLING WITH TFO COMMUNICATION LINKS

(75) Inventors: Eckhard Delfs, Nürnberg (DE); Karl Hellwig, Wonfurt (DE); Rudolf Hoffmann, Forchheim (DE); Emilian Ertel, Nürnberg (DE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 475 days.

(21) Appl. No.: 09/779,637

(22) Filed: Feb. 9, 2001

(65) Prior Publication Data

US 2001/0019958 A1 Sep. 6, 2001

(30) Foreign Application Priority Data

Feb. 11, 2000 (EP) ............................................ 00102223

(51) Int. Cl.⁷ ................................................. H04Q 7/20
(52) U.S. Cl. ...................... 455/445; 455/433; 455/560; 370/523; 375/219
(58) Field of Search ................................ 455/445, 433, 455/560; 370/522, 345, 509, 287, 405, 523, 525, 526; 375/219, 242; 714/752; 379/386

(56) References Cited

U.S. PATENT DOCUMENTS

| 5,768,308 A | * | 6/1998 | Pon et al. ..................... 375/219 |
| 5,953,666 A | * | 9/1999 | Lehtimaki .................... 455/439 |
| 6,009,383 A | * | 12/1999 | Mony .......................... 704/200 |
| 6,034,994 A | * | 3/2000 | Yoon ........................... 375/242 |
| 6,172,974 B1 | * | 1/2001 | Tseng et al. ................. 370/357 |
| 6,295,302 B1 | * | 9/2001 | Hellwig et al. ............. 370/522 |
| 6,308,063 B1 | * | 10/2001 | Koistinen et al. ......... 455/422.1 |
| 6,556,844 B1 | * | 4/2003 | Mayer ........................ 455/560 |
| 2002/0049860 A1 | * | 4/2002 | Koistinen ................... 709/247 |

FOREIGN PATENT DOCUMENTS

| GB | 2 353 192 A | * | 2/2001 | ............ H04Q/7/30 |
| WO | WO 97502262 A2 | * | 12/1997 | ............ H04Q/7/20 |
| WO | WO00/47007 P A | | 8/2000 | |
| WO | WO 0047007 A1 | * | 8/2000 | ............ H04Q/7/30 |

OTHER PUBLICATIONS

Huh et al, US 2002/0027930 A1, Mar. 2002.*
Huh et al. , US 2002/0027930 A1, Mar. 2002.*

(List continued on next page.)

Primary Examiner—Charles Appiah

(57) ABSTRACT

The invention provides method and apparatus for transporting tone signalling information through a GCME link in a GSM network supporting TFO and speech compression modes for the passage of signals through the link, respectively using TFO frames and TRAU-like In a data stream to the local entrance to the GCME link, a tone signal to be transported is detected. The detected tone signal is coded into bits of a TFO or TRAU-like frame for sending through the GCME link, including setting bits to mark the frame as a containing tone signalling information and setting bits to identify the detected tone signal, whereby the tone signalling information is transported in-band through the GCME link as a marked TFO or TRAU-like frame. At the remote exit from the GCME link, the marked frame is detected and the tone signal regenerated in dependence upon the bits of the marked frame.

16 Claims, 2 Drawing Sheets

OTHER PUBLICATIONS

"Public Switched Telephone Network (PSTN); Multifrequency signalling system to be used for push–button telephones", ETSI Technical Report ETR 206, Sep. 1995, pp. 1–19.

"Digital cellular telecommunications system (Phase 2 +); Support of Dual Tone Multi–Frequency signalling (DTMF) via the GSM system", ETSI TS 100 532–V7.0.1 (Jul. 1999); GSM 03.14 version 7.0.1. Release 1998, pp. 1–10.

"Digital cellular telecommunications system (Phase 2 +); Tandem Free Operation (TFO); Service description; Stage 2", ETSI TS 101 732– V7.0.1 (Jul. 1999); GSM 03.53 version 7.0.1 Release 1998, pp. 1–15.

Yasuda, S. et al., "Network Functions for the Application of Multi–rate Speech Coding in Digital Cellular Systems", Proceedings of the IEEE Vehicular Technology Conference (VTC), Stockholm, Sweden, Jun. 8–10, 1994, vol. CONF. 44, pp. 306–310, XP000496684.

Nakamura, H. et al., "Call Control Protocol for Digital Cellular Radio Interface", Proceedings of the Vehicular Technology Society $42^{nd}$ VTS Conference, Denver, CO., USA, May 10–13, 1992, vol. 2, pp. 790–793, XP000339902.

Yabusaki, M. et al., "Voice Communication Connection Control in Digital Public Land Mobile Networks", IEICE Transactions on Fundamentals of Electronics, Communications and Computer Sciences, vol. E75–A (1992), Dec., No. 12, Tokyo, JP, pp. 1702–1709, XP000339157.

* cited by examiner

TONE SIGNALLING WITH TFO COMMUNICATION LINKS

This application claims priority under 35 U.S.C. §§119 and/or 365 to 00102223.5 filed in Europe on Feb. 11, 2000; the entire content of which is hereby incorporated by reference.

TECHNICAL FIELD OF THE INVENTION

The present invention relates to method, system and apparatus for tone signalling with TFO (Tandem Free Operation) communication links.

TECHNICAL BACKGROUND AND RELATED ART

In public switched telephone networks (PSTNs) tone signalling, in particular DTMF (Dual Tone Multi-Frequency) signalling, is employed as an in-band signalling method to offer the customer various services, for example control of a voice mailbox, phone banking/booking systems or other authentication procedures. By pressing one of the push buttons on a phone, a DTMF generator compiles a signal which consists of a pair out of eight different predefined tones. It is actually the combination of the two tones which codes a digit or letter on the pressed button. The characteristics of the transmitted tones follow a specification as described for example in "CEPT T/CS 46–02 "Multifrequency signalling to be used for push-button telephones" (Ref. 1).

On older analog transmission lines the characteristics of the signal could be changed for example by modulation/demodulation, level loss, added noise, or the like. As a consequence, the specification of a DTMF receiver defines the allowed deviations of a DTMF signal from its mean characteristic (see Ref. 1). In a DTMF receiver a signal is recognized as a DTMF signal when its characteristic lies within the defined limits in terms of time, level and signal-to-noise ratio (SNR).

Tone signalling, in particular DTMF signalling, can also be used in mobile communications systems, such as GSM systems. However, in the development of GSM systems it was considered that a problem would arise insofar as speech coding or speech compression is applied at a mobile telephone or mobile station MS. In such GSM systems, compressed speech is sent from the MS at 16 kbps or 8 kbps (Full Rate/Enhanced Full Rate or Half Rate). Conventionally, the speech is then transcoded and carried in the infrastructure of the system at a higher bit rate of 64 kbps (PCM). It was considered that, if generated in the MS, tone signals such as DTMF signals would, as a result of being subject to the speech coding or compression in the MS, lie outside the defined limits after transcoding to 64 kbps PCM and so would likely not be recognised by a DTMF receiver. For this reason, in GSM systems, tone signals such as DTMF signals are not generated in the MS itself but are generated on the infrastructure side, in the local mobile switching center MSC via which the MS is communicating, so that the DTMF signals are not subject to the speech coding or compression. When keys in the MS are pressed, separate out-of-band signalling messages are sent by the MS, upon reception of which a generator in the local MSC generates the DTMF signals. The DTMF signals are then sent from the local MSC in a clear, uncompressed form, at 64 kbps PCM.

This handling of DTMF is specified in the uplink (MS→network/infrastructure) direction in GSM systems. See "Support of Dual Tone Multi-Frequency (DTMF) via the GSM System", GSM 03.14, ETSI TS 100 532 V7.01, 1999-07 (Ref. 2). In the downlink direction (network→telephone), however, handling of DTMF is not specified.

Generally, it was considered that specification of the handling of DTMF was not needed in the downlink direction because in most cases the DTMF signals sent from an MSC as explained above, in response to keypresses on a mobile station MS, would be intended for a destination other than a mobile station (MS), for example a voice mail service at an MSC or other services at public switched telephone network (PSTN) destinations. Therefore it was considered that the DTMF signals sent from the MSC would pass clear and uncompressed over a 64 kbps link and should not again be subjected to speech coding or compression such that they would be made unrecognisable for a DTMF receiver at the destination. Although, there is no reason in principle why DTMF signals sent from an MSC, or originating from another source such as a PSTN telephone, should not be destined for a mobile station MS, it was accepted that the DTMF signals would be subjected to speech compression or coding in the downlink to the MS and so would probably not be recognisable by a DTMF receiver at the mobile station.

In mobile communication systems, such as GSM systems, speech coding or speech compression applied as mentioned above degrades the quality of signals by introducing non-linear distortions. Generally, in Mobile-to-Mobile calls (MS-MS calls) speech coding/decoding happens at least two times, i.e. in a tandem manner. First, in the uplink direction encoding to lower bitrates (e.g. 16 kbps or 8 kbps) takes place in the first MS, with decoding/transcoding to a higher rate (64 kbps in GSM systems) in its counterpart on the infrastructure side, a first transcoder (TRA or TRAU—Transcoder and Rate Adaptation Unit). The second coding process happens in downlink direction, with encoding/transcoding in a second TRAU and decoding in the second MS. More coding processes could occur on long distance lines between the two TRAUs. Unfortunately, each instance of coding/decoding (codec) in such a tandem configuration adds new noise resulting in more and more degraded speech.

In order to avoid the "tandem" codec situation, ETSI (European Telecommunications Standards Institute) has recently specified a "Tandem Free Operation" (TFO) protocol for Mobile-to-Mobile calls in GSM systems—see "Inband Tandem Free Operation of Speech Codecs", GSM 08.62 (Ref. 3) and "Tandem Free Operation (TFO)", GSM 03.53 version 7, Release 1998; ETSI TS 101 732 V7.01 (1999-07) (Ref. 4)—which allows speech coding devices to be bypassed by applying inband signalling.

Using the TFO protocol, in a Mobile-to-Mobile call (MS-MS calls), speech is coded or compressed in the first MS but passes through the first and second TRAUs, in the uplink and downlink, without transcoding, to be decoded in the second MS.

The TFO protocol, in its basic operation, affects only the TRAUs and is fully compatible with existing GSM equipment. The TFO protocol is standardized for example for GSM speech traffic channels, for Enhanced Full Rate, Full Rate (16 kbps) and Half Rate (8 kbps). Using the protocol in GSM systems, the speech quality is lifted up to the high level of a single-codec configuration, once the in-band signalling protocol has verified that the prerequisites for establishing a TFO connection between two TRAUs are fulfilled.

As explained above speech signals are compressed in the MS→Network/Infrastructure uplink and in the Network/

Infrastructure→MS downlink. However, proposals have been made to compress speech signals also in the infrastructure of a mobile communications network such as a GSM network, to enable a number of speech channels to be carried over a 64 kbps MSC-MSC link in the infrastructure. The equipment used for this purpose is known as Digital Circuit Multiplication Equipment or DCME. Two DCME "heads" are placed between the pair of MSCs between which the MSC link is established, which heads provide complementary speech compression and decompression so that a number of channels, for example four 16 kbps channels, can be combined into one 64 kbps link between MSCs. This enables a saving of transmission costs in the inter-MSC network/infrastructure, but introduces the disadvantage that a further instance of speech compression/decompression (codec) is involved, with consequent degradation of speech quality. The speech compression used may for example be standard compression, i.e. 1:4 via EFR (Enhanced Full Rate).

The TFO protocol now offers the possibility of a cost efficient transmission within the fixed or infrastructure part of the network, but without the disadvantage of a further instance of speech compression/decompression (codec). Since a TFO connection actually requires only a reduced bitrate, for example 8/16 kbps (GSM Half Rate/Full Rate), infrastructure link, between the involved TRAUs, it is possible to carry for example four TFO channels over a 64 kbps link without the need for an additional instance of speech compression/decompression. Thus, the TFO protocol offers not only the possibility for exploiting the reduced bandwidth requirements of TFO communications but also increased speech quality, provided that DCME equipment is installed which is compatible with the TFO protocol. Such equipment is referred to as "TFO Specific Circuit Multiplication Equipment" or TCME, in the context of GSM systems as "GSM specific DCME equipment" or GCME.

It will also be understood that, although originally intended primarily for MS-MS calls, the TFO protocol can be applied to MS-PSTN calls when such GCME equipment is provided in a GSM system. For an MS-PSTN call, the destination GCME head transcodes from the TFO rate or compressed speech rate used between the GCME heads (e.g. 16 kbps) to for example 64 kbps for the PSTN network. Application of the TFO protocol to MS-PSTN calls can offer improvement in speech quality in that further compression, such as is always effected in current DCME multiplexing devices on long distance links, can be avoided with the TFO protocol.

Further, if calls originating from PSTN networks are subjected to speech coding/compression at the interface of the PSTN network with the mobile communications network, the TFO protocol may also be applied to such PSTN originating calls, to again offer the possibility of bandwidth savings with regard to PSTN originating calls and to avoid speech quality degradation resulting from compression/decompression in TCME/GCME equipment in the mobile communications network.

For GSM communications network operators, including DCS (Digital Communication System 1800) and PCS (Personal Communication System 1900) operators, such TFO/GCME (or combined "TFO-capable TRAU" and GCME) solutions would be of considerable interest, since such solutions would offer both increased speech quality and the possibility of reduced transmission costs in their core network. Hereinafter, references to GSM systems should be understood to include references also to related systems, such as DCS and PCS systems, which are largely based on GSM protocols and procedures.

However, the problem exists that the GSM TFO protocol does not support the carrying of tone signals such as DTMF signals, and GCME functionality is not standardized for the carrying of tone signalling, such as DTMF tone signalling.

The handling of DTMF signals, in a GSM mobile communications network in which it is desired to exploit the possibilities offered by the TFO protocol and GCME equipment, thus represents a problem. It is possible that this problem could be dealt with by providing that, in the event that DTMF signals are to be sent through the network, a link involved defaults back from TFO/GCME mode to conventional mode (i.e. non-TFO, non-GCME 64 kbps) to pass the DTMF signals. However, this would be expensive to implement and have significant drawbacks, not least because it would involve dynamic switching of the link between the different modes, as discussed in more detail below.

There is thus a need for a more economic, simple to implement manner of dealing with tone signals, such as DTMF tone signals in the context of TFO-capable GSM mobile communications systems and more particularly in such systems in which GCME functionality is implemented.

SUMMARY

Problems Addressed by the Present Invention

The present invention is thus concerned with the provision of tone signalling, e.g. DTMF tone signalling, in relation to GSM TFO (tandem free operation) links, the protocol of which does not take into account the need to transport such tone signalling, employing circuit multiplying equipment (GCME, TCME).

Solution Provided by the Present Invention

According to the present invention there is provided a method as claimed in claim 1 and apparatus as claimed in claim 7.

The remaining claims set out further advantageous or preferred developments of forms of the present invention.

Advantages of the Invention

With the present invention, a method is provided for handling DTMF signalling in a GCME-GCME chain whereby system complexity is kept at a minimum and development costs are reduced. The effort and outlay needed for implementing the present invention is much less than would be involved in implementing alternative possible means of handling tone signalling in GSM TFO/GCME communications. The present invention provides for in-band handling and transportation of tone signalling information, avoiding the need to effect significant modifications to the mobile communications system.

With preferred embodiments of the invention, all inter-MSC speech traffic can be exchanged at the lower rate, e.g. 8 or 16 kbps, due to the TFO protocol in "TFO operational" mode and the use of speech compression in "no TFO operational" mode, and DTMF tones can also be exchanged with this lower rate of 8 or 16 kbps. There is no need to switch to a full 64 kbps duplex channel between two GCME components to handle DTMF signalling, so that dynamic switching for this purpose is avoided. The bandwidth needed for a TFO channel can be maintained and DTMF signalling can be safely passed, in-band, through this channel, whereafter the DTMF tone or tones concerned can be regenerated. Equipment for putting the invention into effect can be developed on the basis of existing network infrastructures. For example, no changes are needed with regard to the MSCs and/or the DTMF generators in the MSCs, and the handling of DTMF as specified for the MS→network/infrastructure uplink (see Ref. 3) need not be altered.

Moreover, preferred embodiments of the present invention can even provide for reduced transmission costs in MS-PSTN calls, since the transcoding can be moved from the TRAU handling the call from the MS to a GCME component at the edge of the PLMN (Public Land Mobile Network), where the PSTN is interfaced with the GCME component.

DETAILED DESCRIPTION OF PREFERRED EMBODIMENTS

Figure 1:
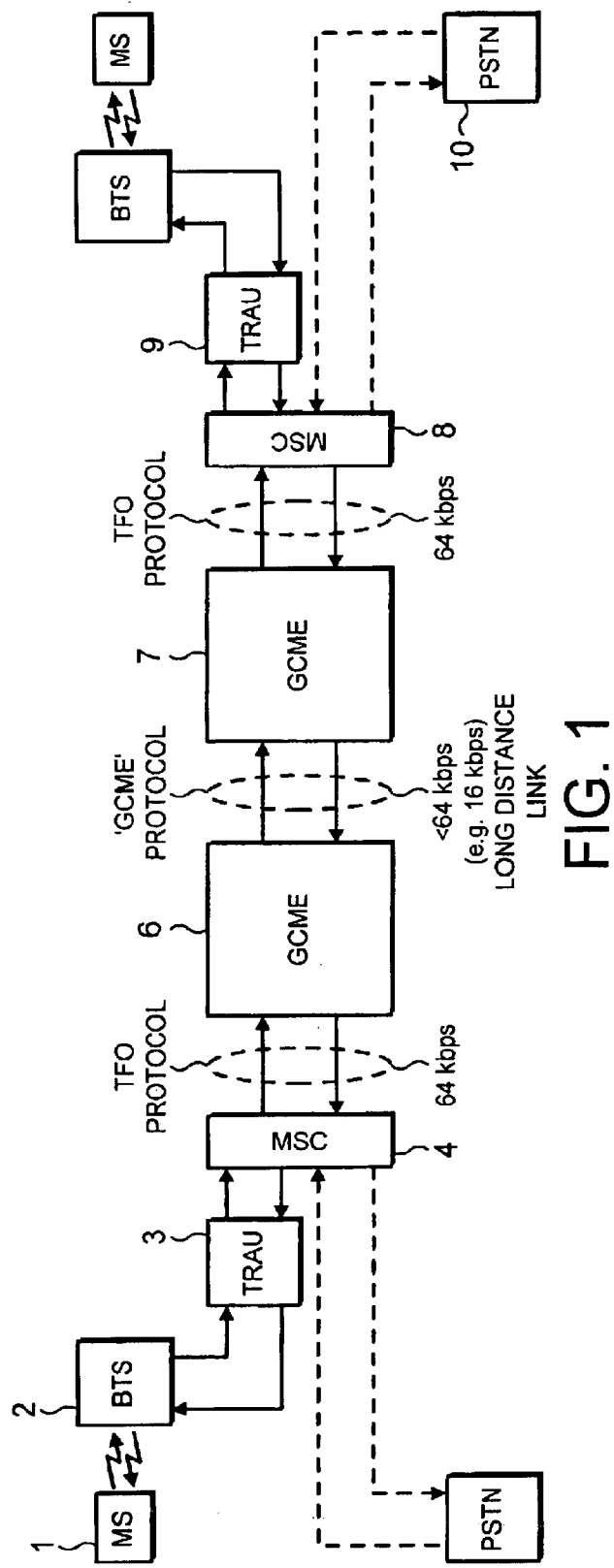
FIG. 1 is a schematic block diagram of parts of a GSM mobile communications network employing TFO and GCME protocols.

FIG. 1 illustrates parts of a GSM configuration, using the TFO protocol and incorporating GCME equipment, with which the present invention can be employed.

In the configuration of FIG. 1, signals from a mobile unit MS 1 pass via a base transceiver station BTS 2 to a mobile switching center MSC 4 with which a transcoding and rate adaptation unit TRAU 3 is typically associated.

In conventional operation, TRAU 3 transcodes the coded/compressed signals from mobile unit MS 1 from the 16 kbps (Full Rate/Enhanced Full Rate) or 8 kbps (Half Rate), used for the radio link to the MS 1 and between BTS 2 and TRAU 3, to 64 kbps PCM, normally used in the infrastructure of the mobile communications system.

In Tandem Free Operation for MS→MS calls, however, coded/compressed signals from MS 1 are not transcoded in the TRAU 3 but are forwarded as "TFO frames" from the TRAU 3. The TFO link is established by in-band signalling between TRAU 3 and a destination TRAU 9, typically associated with a destination MSC 8, and the TFO frames are transferred from TRAU 3 to TRAU 9 by in-band signalling, i.e. by inserting them into the 64 kbps PCM stream (one or two LSBs—least significant bits) between the MSC/TRAUs. These TFO frames are very similar to the TRAU frames which are exchanged between BTS 2 and TRAU 3. Each TFO frame covers 20 ms of coded speech.

Conventionally, in the absence of GCME equipment, TFO frames are sent in the 64 kbps stream to the destination MSC/TRAU 8,9 where, the intended destination of the signals originating from MS 1 being another mobile station, transcoding is again omitted and the signals forwarded to the destination MS.

In this conventional case, the TFO link established in the 64 kbps stream between MSC 4 and MSC 8 actually requires a bit rate of bandwidth of only 16 kbps (or 8 kbps, at Half Rate). As a result, most of the bandwidth of the 64 kbps stream is effectively wasted when a TFO link is established for an MS→MS call.

In this conventional case, if MS 1 wishes to send tone signals, for example DTMF signals, the specified procedure as described above can be used by defaulting back to non-TFO mode and using the full 64 kbps to pass the DTMF signals in the normal manner.

As is illustrated in FIG. 1, GCME circuit multiplication equipment is installed between with a view to exploiting the reduced bandwidth needs of TFO communications also in the infrastructure of the system, i.e. between the MSC/TRAUs, and avoiding the waste of bandwidth as mentioned above.

It will be understood that such GCME equipment offers two modes: a "no TFO Operational" mode in which complementary speech compression/decompression is applied by two GCME "heads", and a "TFO Operational mode" in which speech compression/decompression is not applied but TFO frames are passed between the two GCME "heads". This latter mode offers increased speech quality, whilst the former mode allows bandwidth to be maintained if TFO operation is not possible.

As will be seen, two TCME/GCME components 6, 7 are needed in each MSC-MSC link. Communications between the "local" GCME component 6 and the "remote GCME" component 7. e.g. over the long distance infrastructure link, take place at a bit rate less than 64 kbps, e.g. 16 kbps or 8 kbps as required by a TFO link, in "TFO Operational" mode, or a standard speech compression link in "no TFO operational" mode. This means for example that four links or channels could be established through a 64 kbps stream available between the two GCME components, with no waste of bandwidth, or that a lesser bandwidth can be made available for the stream between the two GCME components.

GCME functionality is not yet standardized, but one advantageous possibility for such functionality which is economical to implement and which can be employed in accordance with the present invention may be such that TFO mode is adopted whenever possible, with fall back to coding/decoding (compression/decompression)—only when necessary—to maintain four channels in the 64 kbps stream even when TFO mode is not possible.

Thus a scheme may be adopted as follows:

a) operate in TFO mode whenever possible if a 64 kbps link from an MSC/TRAU is active;

b) fall back to standard compression rate (e.g. 1:4 using EFR—Enhanced Full Rate) if the 64 kbps link is idle or if TFO is not possible.

This scheme would allow the TFO/TRAU synchronization scheme between the two involved GCMEs 6, 7 to be upheld at all times, independently of whether a call is ongoing or not.

It should be understood that the present invention can be used not only with the above scheme, but can also be employed with other schemes on the basis of which GCME functionality may be implemented.

Thus, with the GCME equipment installed, two modes are available for the GCME 6–GCME 7 link:

"TFO Operational":

In this mode, TFO frames are passed between the GCME devices 6 and 7. This is the desired mode, adopted whenever possible, offering improved speech quality.

"no TFO Operational":

In this mode, TRAU-like compressed speech frames are passed between the GCME devices 6 and 7. This is a less desired mode, because the additional instance of speech compression/decompression degrades speech quality, but is available when TFO mode is not possible, to maintain (lesser) bandwidth usage for each channel.

Figure 2:
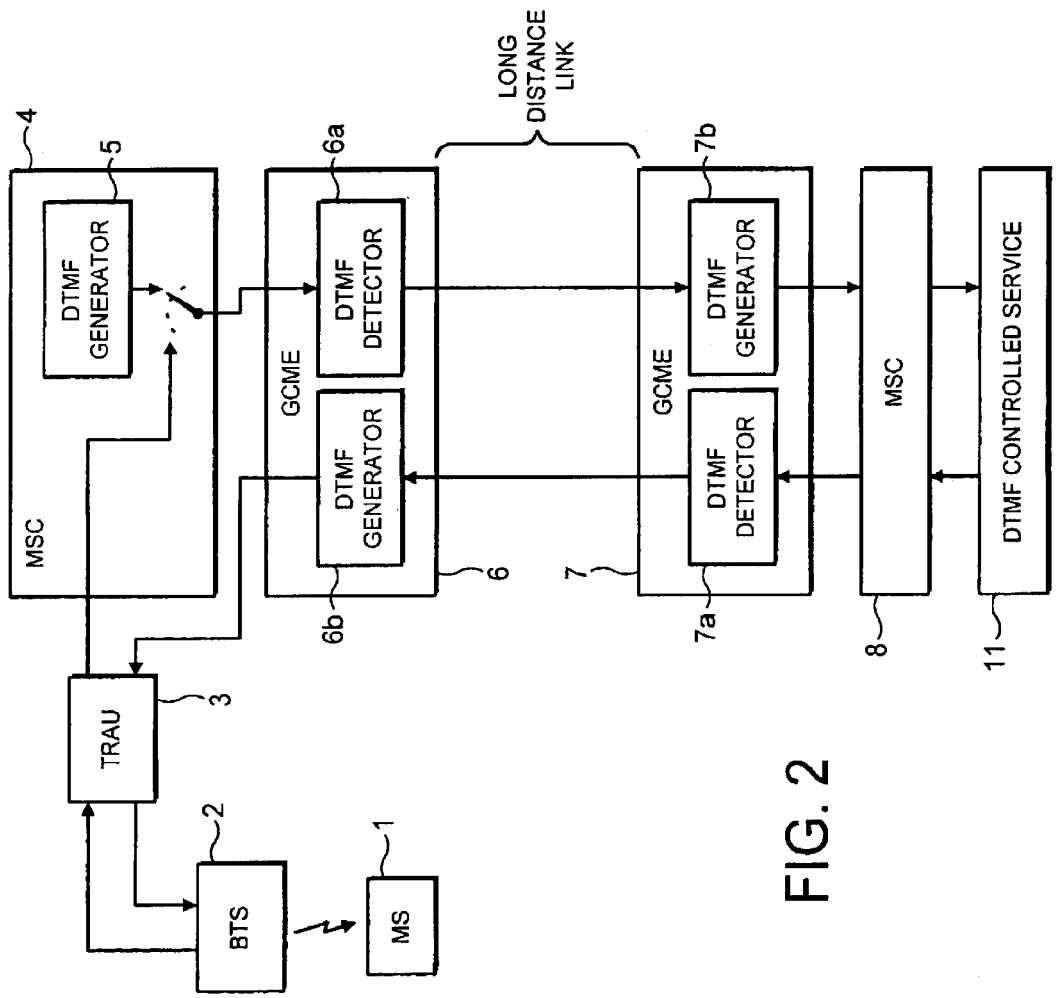
FIG. 2 is a schematic block diagram of parts of a GSM mobile communications network, illustrating the passing of DTMF signalling through the network.

As mentioned above, the in-band transportation of DTMF signals is not part of the TFO protocol in GSM systems. Furthermore, when GCME functionality is implemented in the system, such transportation of DTMF signals must also be handled compatibly with the GCME equipment, if DTMF signalling is to be properly supported. FIG. 2 illustrates the problems involved.

In FIG. 2, a mobile subscriber 1 has made a call to a DTMF controlled service 11, such as a voice mail service for example.

By way of example, for the purposes of explanation, it is assumed that prior to a first keypressing in the MS 1, the TRAU 3 has established Tandem Free Operation with the GCME equipment 6, 7. In TFO mode, the TRAU 3 converts the TRAU frames received from the BTS 2 into TFO frames and forwards them to the MSC 4 on a 64 kbps link, using only one or two LSBs (Least Significant Bits) on the PCM stream. The MSC 4 routes the 64 kbps link to a local GCME 6 equipment. This extracts the TFO frames and forwards them to a remote GCME 7 device. At the remote location, the remote GCME 7 device performs transcoding towards 64 kbps A-law or µ-law PCM for delivery of signals to the service 11. In effect, the remote GCME 7 device replaces the normal TRAU functionality of TRAU 3. The bandwidth needed between the GCMEs 6, 7, or between the MSCS/TRAUs 3,4 and 8, 9 can adapted to the actual needs, i.e. the bandwidth required to transport the TFO frames.

For the purpose of illustration, it is assumed that by depressing of a key in the MS 1, a 'START DTMF' message is sent out-band to the MSC 4, where a DTMF generator 5 is initiated. It is further assumed that by releasing the key in the MS 1, a 'STOP DTMF' message is sent out-band to the MSC 4, where the DTMF generator (5) is stopped.

In practice, in GSM systems, the MSC 4 is unaware of the established TFO connection, i.e. the MSC 4 is unaware of whether TFO mode or non-TFO mode has been adopted by the TRAU 3. Further, the TRAU 3 is not involved in the DTMF generation. The result is that the local GCME 6, located close to the DTMF-generating MSC 4, will suddenly see corrupted TFO frames, once the DTMF generator 5 in the MSC 4 has been started.

To handle the DTMF signals, provision might be made for the link to default out of TFO/GCME mode, for example such that:

1. Both involved GCMEs 6, 7 re-establish a 64 kbps link (i.e. non-TFO mode, non-GCME mode) and transparently pass the 64 kbps data received from the MSCs 4, 8, or
2. as a possible variant, the GCMEs switch to 32 kbps ADPCM (Adaptive Delta PCM).

These possibilities might both be sufficient to deal with the DTMF signalling problem, but they would be expensive to implement and have further significant drawbacks. For example, they would require dynamic switching (the remote GCME 7 has to be informed as well) between 64/32 kbps and the required TFO sub-rate. The moment of switching would be quite critical, since a delay could cause parts of the DTMF information to get lost, resulting in a failure of the DTMF controlled service 9 to interpret the signal. This may have severe impact at the subscriber side, if DTMF is used to control remote devices like heating equipment, for example.

In accordance with the present invention, however, a method is provided which does not experience the above-explained problems and disadvantages. Furthermore, embodiments of the present invention may be completely compatible with GSM TFO, and GCME, protocols.

A preferred embodiment of the invention will now be explained with further reference to FIG. 2.

It will be understood that the functionality itself is full duplex. That is, both local and remote GCMEs 6 and 7 are equipped with a DTMF detector 6a, 7a and DTMF generator 6b, 7b, as explained in more detail below.

Individual parts or steps in accordance with the preferred embodiment of the invention will now be explained. As above, it is assumed that DTMF signals are about to be transmitted from the mobile unit MS 1 to the DTMF controlled service 11.

DTMF Detection

In the favoured "TFO operational mode", when the DTMF generator 5 of the MSC 4 is started, the result, as explained above, is the issue of corrupt or non-valid TFO frames.

The procedure used to verify the validity of a TFO frame is specified in Ref. 3. This procedure includes checking the Synchronization bits T bits Control bits and CRC block bits if applicable of the TFO frame.

On the basis of such a procedure, once the local GCME 6 observes, in "TFO Operational" mode, that the incoming 64 kbps stream from the MSC 4 does not contain valid TFO frames, it starts (continues) to operate a DTMF detector 6a. It is not required that errors in the stream actually result in a "no TFO frame present" classification as described in Ref. 3. The criterion used to launch the DTMF detector may be simply the presence of one or more errors in one received TFO frame. The point is to start the DTMF detector as soon as possible in order not to fail to recognise a potential start of a DTMF signal.

An alternative option, which may also be employed in an embodiment of the present invention for the "TFO Operational" mode, is to operate the DTMF detector 6a also in case that valid TFO frames are arriving, i.e. even if no TFO frame errors have been detected. In effect, DTMF detection is executed in parallel to the TFO protocol. The reason is that a sudden insertion of a DTMF sequence into the 64 kbps stream may not immediately result in a 'not-valid' classification of the TFO frame in the GCME 6 or detector 6a. This is because of the arbitrary phase within the TFO frame, which could be affected first. Another reason is that the effect of the disturbance may leave the checked TFO bits unaffected for some time. A continuous operation of the DTMF detector 6a ensures that the beginning of the DTMF tone will not get lost.

In the "no TFO Operational" mode, for example if the link is idle or in the case of a handover procedure, the DTMF detector must run all the time. This is the case in the event of continuous DTMF signalling, for example if the user of MS 1 is entering a PIN.

There is one special case to observe: in case that the DTMF detector 6a finds a DTMF signal in the incoming 64 kbps stream but incoming TFO frames (in "TFO Operational" mode) are still judged valid, no DTMF-marked TFO frames are sent to the remote GCME. That is, the result of the DTMF detection is ignored. The reason should be seen in the extremely small possibility that a valid TFO frame may include a signal mimicking a DTMF signal pattern.

DTMF Detection Criterion:

The generation of DTMF signals in the generator 5 in MSC 4, and the resulting appearance of corrupt TFO frames in the 64 kbps stream the GCME 6 will—sooner or later—result in "no TFO Operational" mode for the GCME link. This is because of the length of the DTMF tones (see Refs. 1 and 2). The GCME must terminate the "TFO Operational" mode as soon as TFO termination criteria (see Ref. 3) are fulfilled. It is observed that this termination is independent of whether DTMF signals are found in the 64 kbps stream or not (i.e. there are causes other than the presence of DTMF signals which might cause termination of TFO mode). However, it is possible that the DTMF detector 6a, or GCME 6, might detect a DTMF symbol before or after termination of the "TFO Operational" mode. Thus, there are two cases to be considered.

1. If GCME 6 detects a DTMF character while still in "TFO Operational" mode, this means that conditions which will terminate the "TFO Operational" mode have not yet arisen (but it is very likely that the "no TFO Operational" mode will be adopted very soon—DTMF generator 5 will probably generate DTMF for at least 100 ms, depending on network operators setting) However, information about the detected DTMF symbol should be forwarded to the remote GCME 7 as soon as possible, to avoid unnecessary delays. This means that the next TFO frame to be sent to the remote GCME should contain information for that GCME to generate the detected DTMF symbol. In this case, DTMF information is transported in-band, in a TFO frame, as explained in more detail below.

2. The GCME 6 may detects a DTMF symbol after it has already performed a transition from "TFO Operational" to "No TFO Operational" mode. This is probably the most likely traffic scenario, as it takes some time for the DTMF detector to detect a DTMF signal. In this case, the GCME is in "standard compression" mode and normally send/receives compressed speech framed to/from GCME 7. Use of a framing format for this mode which is similar to the TFO/TRAU framing format is preferable, since the capability for handling this format or protocol is already available in the GCME (e.g. TRAU-like EFR formatting). The DTMF symbol information is then forwarded to the remote GCME 7, in-band, as above. The next TRAU-like EFR frame contains DTMF information, as explained in more detail below.

For completeness, there must also be considered a case in which "TFO Operational" mode was not established. In this case:

3. GCME 6 detects a DTMF signal in "no TFO Operational" Mode. This is likely to indicate the presence of a longer DTMF sequence, e.g. when a PIN is being entered, or a failure to establish a TFO connection with the TRAU 3 during the call (or possibly, TRAU 3 may not support TFO). As in case 2, the DTMF character is then forwarded in-band to the remote GCME 7. The next TRAU-like EFR frame contains DTMF information.

The criterion for the DTMF detector 6a is in accordance with the provisions of Ref. 1. As indicated above, as soon as a DTMF symbol has been identified, information is forwarded in-band to the remote GCME 7. In terms of signal delay, this means that the DTMF signal generated originally in 5 undergoes a delay of at least the time needed to detect a DTMF signal (as specified in Ref. 1). Additionally, a delay of 0 . . . 20 ms is possible, depending on how the precise moment of detection fits to the current TFO/TRAU frame structure. Realistically, this will mean a delay of about 40 . . . 80 ms. This is not critical from a DTMF service point of view, as DTMF generation is asynchronous in GSM systems.

Since a DTMF symbol could be generated for a long as the key pressing is effected in the MS 1, DTMF frames need to be repeated as long as the DTMF signal is determined to be present by the detector 6a.

In-Band DTMF Transmission

To transfer DTMF information to the remote GCME 7, a signalling scheme is used which is based on the TFO/TRAU-synchronization, using a TFO/TRAU-like frame which is marked as a DTMF frame.

The receiver of the DTMF frame (e.g. local GCME 6) marks the DTMF frame to distinguish it from a normal TFO/TRAU frame. In accordance with variants of the preferred embodiment of the present invention, different possibilities exist for dealing with this.

The preferred variant uses the BFI (Bad Frame Indicator) and a part of the data field of the frame, as explained below.

The BFI=Bad Frame Indicator is a quality indicator in a TFO frame giving information about the reliability of the included speech parameter bits. A speech decoder fed with such a frame will discard the received data bits and perform error concealment based on parameters found in the last good speech or silence frame.

In accordance with the preferred variant, the BFI is used together with a part of the data field in the TFO/TRAU frame in order to forward the DTMF information. The most immediate benefit of this variant is that it does not violate the TFO protocol in any way. In accordance with this variant, a DTMF frame consists of three or four bit fields:

1. BFI indicating a bad frame
2. DTMF header field: the first (e.g. 16) bits in the data field of a TFO/TRAU frame set to a predetermined value, e.g. all '1'.
3. DTMF information field: the coding of the DTMF symbol (e.g. 4 bits), and preferably
4. DTMF information protection field: A CRC or parity protection on the DTMF info field (e.g. 1–3 bit).

If the local GCME 6 receives a valid TFO frame (i.e. non-DTMF frame) in the 64 kbps stream which is marked as bad (via BFI), it preferably sets all 16 bits in the data field of the TFO frame belonging to the DTMF header to a predetermined value different from the predetermined value mentioned at 2 above, for example all '0's. This is desirable since the original data bits of the incoming TFO frame might, through chance, be identical to the predetermined DTMF header value mentioned at 2 above.

Thus, the GCME 6 receiving this frame uses the BFI information and the DTMF-header in order to decide whether it is a normal (but bad) TFO frame or a DTMF frame.

Preferably, the number of bits used to code the DTMF header should not exceed the required number of speech parameter bits which are used to carry information about the spectrum. The reason is that some speech codecs (e.g. EFR—Enhanced Full Rate) use some part of the data bits to generate the excitation sequence even if the frame is marked as bad, although the spectral parameters of bad frames are never used.

Thus, a DTMF frame is provided by marking the TFO frame as bad, using the BFI field, and setting all bits of the DTMF header field to a predetermined pattern, for example all '1'. The bits of the DTMF information field are coded to carry the actual DTMF information. Since 16 DTMF symbols exist, the symbol information can be coded using 4 bits. This coding may be as indicated in the Table below, but any other suitable coding may be used.

TABLE

| DTMF Symbol | Coding |
| --- | --- |
| 1 | 0000 |
| 2 | 0001 |
| 3 | 0010 |
| 4 | 0011 |
| 5 | 0100 |
| 6 | 0101 |
| 7 | 0110 |
| 8 | 0111 |
| 9 | 1000 |
| * | 1001 |
| 0 | 1010 |
| # | 1011 |

TABLE-continued

| DTMF Symbol | Coding |
| --- | --- |
| A | 1100 |
| B | 1101 |
| C | 1110 |
| D | 1111 |

DTMF frames are, as indicated above, sent as long as a symbol is continuously detected in the detector 6a. The first DTMF frame causes the generation of a DTMF symbol with at least the length specified in Ref. 1, whilst each subsequent DTMF frame causes a prolongation of the symbol by 20 ms.

To cope with the potential problem of octet slips in the PCM stream within the GCME components, the 4-bit DTMF information field should preferably be protected with CRC or parity bit, as indicated above. The required number of bits for this protection should best be located directly after the DTMF information field.

Furthermore, it may be desirable to send each DTMF frame twice, in order to ensure that an error during transmission of a DTMF frame (bit error or octet slip) will not result in a lost DTMF symbol. Since the spacing of consecutively sent DTMF symbols from the MSC is at least 80 ms, the double forwarding of a DTMF symbol over the GCME-GCME link does not introduce more signal delay. After the transmission of two DTMF frames there has to be at least one non-DTMF frame before the next DTMF frame can be sent.

In accordance with a variant of the above embodiment of the present invention, an alternative option is provided which involves the use of the spare bits of the TFO frame to forward DTMF information. The spare bits of the TFO frame are (c6–C11), C16 and C18–C21. If the GCME is using standard compression in non-TFO mode, the spare bits occur here also. The BFI indicator can be used as well to code DTMF frames.

However, a potential drawback of a variant based on the use of spare bits of the TFO frame is that the TFO standard may be changed in future. According to Ref. 3, the spare bits should be set to binary '1'.

In a similar manner, TRAU-like EFR frames can be marked as DTMF frames and carry DTMF information.

Thus, when transporting DTMF information, bandwidth as required by a TFO channel is maintained.

DTMF-Tone Re-Generation

In the remote GCME 7, the DTMF detector 7a distinguishes between TFO/TRAU frames containing speech information and DTMF frames, received from the local GCME 6. The detector 7a accomplishes this on the basis of the marking of the frames as described above in the local GCME 6.

Re-Generation Criterion:

As soon as a valid DTMF frame is recognized by the detector 7a in the remote GCME 7 and the last received frame was not a DTMF frame, a DTMF generator 7b is started to generate a 64 kbps DTMF tone with the length specified in Ref. 2. The DTMF tones should be generated according to the provisions of Ref. 1.

However, since detection and transmission criteria of DTMF symbols are not identical in Ref. 1, GCME 7 is equipped with means for buffering incoming DTMF/TFO/TRAU-like frames. This means in particular that if GCME 7 detects that the latest incoming frame is not prolonging the current DTMF character (e.g. is a normal TRAU-like, EFR coded frame) and the currently generated DTMF symbol has already been (re)generated as long as specified in Ref, 1, then all DTMF "prolongation frames" buffered in GCME 7 may be skipped to avoid further delay.

Moreover, in order not to introduce more delay than necessary, the decision about the validity of the received DTMF frame can be taken as soon as all relevant parts of a DTMF frame have been received. That means in particular that all synchronization bits after the DTMF information protection field do not need to be checked.

It will be understood from the above that according to an embodiment of the present invention, in which the GSM TFO protocol is employed together with digital circuit multiplication equipment (GCME) a solution to the problem of in-band tone or DTMF signalling is afforded which basically consists of three steps or parts:

1) DTMF detection: local equipment (GCME 6) is equipped with a DTMF detector 6a. If in "TFO Operational" mode, this detector may be initiated as soon as the TFO protocol at the local GCME side gets corrupted. Alternatively, the detector may operate continuously even if valid TFO frames are being received. In "no TFO Operational" mode, the detector operates continuously.

2) In-band DTMF transmission: As soon as a DTMF symbol has been identified in the local equipment (GCME 6 or detector 6a), whether "TFO Operational" mode is still effective, or in "No TFO Operational" mode, this information is forwarded in-band to the remote equipment (GCME 7). This is done by using TFO or TRAU-like frames which are specially marked as containing DTMF information. This TFO/TRAU like signalling of DTMF symbols is a key feature of the present invention.

3) DTMF re-generation: The remote equipment (GCME 7 or detector 7a) continuously checks if the received TFO or TRAU-like frame contains TFO coded speech or compressed speech, or DTMF signalling. On reception of a DTMF frame, it starts a local DTMF generator 7b to reproduce a clear DTMF tone using the full 64 kbps link.

Preliminary studies have indicated that GCME equipment can be developed on the basis of existing infrastructures. All inter-MSC speech traffic can be exchanged with 8 or 16 kbps due to the TFO protocol and speech compression mode of the GCME equipment, and this present invention allows the exchange of DTMF tones with 8 or 16 kbps as well, so that no default fallback to 64 kbps or 32 kbps via ADPCM etc is required. Thus, the bandwidth needed for a TFO channel, or compressed speech channel, can be maintained for passing DTMF information. As soon as TFO can be reestablished with a TRAU, e.g. after DTMF signalling has been completed and link transparency has been regained, the GCME equipment can return to "TFO Operational" mode.

With the present invention, system complexity, in particular of GCME equipment, can be kept at a minimum. Link resource management within the GCME-GCME chain is substantially simplified. This is because the invention uses a TFO/TRAU-like signalling for DTMF symbols.

With the present invention, GCME product development costs can be substantially reduced, since with the present invention dynamic switching in a GCME within the duration of a call is not required. The effort and outlay needed for implementing DTMF detection/generation as in the present invention is much less than would be needed for implementing dynamic switching.

Moreover, with the present invention congestion is avoided, whilst any DTMF solutions based on dynamic switching may face the problem of congestion.

With the present invention, a solution to the problem of tone signalling across a TFO communications link is provided would support even reduced transmission costs in MS-PSTN calls, since the transcoding can be moved from the TRAU to the edge of the PLMN (Public Land Mobile Network), where the PSTN is interfaced.

What is claimed is:

1. A method for transporting tone signalling information through a GSM Circuit Multiplication Equipment (GCME) link in a Global System for Mobile Communications (GSM) network supporting Tandem Free Operation (TFO) and speech compression modes for the passage of signals through the link, respectively using TFO frames and Transcoder and Rate Adaptation Unit-like (TRAU-like) frames, the method comprising:

detecting in a data stream to a local entrance to the GCME link, a tone signal to be transported.

coding the detected tone signal into bits of a TFO or TRAU-like frame for sending through the GCME link, including setting bits to mark the frame as containing tone signaling information by setting a bad frame indicator bit (BFI) of the frame to indicate a bad frame and by setting first n bits of a data field of the frame to a predetermined value as a tone signaling header field, and setting bits to identify the detected tone signal, whereby the tone signaling information is transported in-band through the GCME link as a marked TFO or TRAU-like frame, and detecting, at a remote exit from the GCME link, the marked frame and regenerating the tone signal in dependence upon the bits of the marked frame.

2. A method as claimed in claim 1 wherein the frame further includes CRC or parity protection bits for the tone signal information field.

3. A method as claimed in claim 2, wherein the CRC or parity protection bits are located directly after the bits of the tone signal information field.

4. A method as claimed in claim 1, wherein the detected tone signal is coded into spare bits of the frame.

5. A method as claimed in claim 1, wherein the tone signal to be transported through the GCME link is detected by checking for corrupt or non-valid TFO frames arriving in the data stream to the local entrance to the GCME link and, in the event that a corrupt TFO frame is detected, determining whether a tone signaling pattern is carried in the arriving data stream.

6. A method as claimed in claim 1 further comprising transporting each marked frame through the GCME link twice.

7. A method as claimed in claim 1, wherein the detected tone signal is coded into a frame by:

coding additional m bits of the data field corresponding to the tone signal or symbol to be carried as a tone signal information field.

8. Apparatus for transporting tone signaling information through a GSM Circuit Multiplication Equipment (GCME) link in a Global System for Mobile Communications (GSM) network supporting Tandem Free Operation (TFO) and speech compression modes for the passage of signals through the link, respectively using TFO frames and TRAU-like frames, the apparatus comprising:

a detector arranged in a data stream to a local entrance to the GCME link, operable to detect a tone signal to be transported, a coder which is operable to code the detected tone signal into bits of a TFO or TRAU-like frame for sending through the GCME link, including setting bits to mark the frame as containing tone signaling information and setting bits to identify the detected tone signal, whereby the tone signaling information is transported in-band through the GCME link as a marked TFO or Transcoder and Rate Adaptation Unit-like (TRAU-like) frame, and a detector, at a remote exit from the GCME link, operable to detect the marked frame and to regenerate the tone signal in dependence upon the bits of the marked frame wherein the detector, arranged in the data stream to the local entrance to the GCME link, detects the tone signal to be transported through the GCME link by checking for corrupt or non-valid TFO frames arriving in the data stream to the local entrance to the GCME link and, in the event that a corrupt TFO frame is detected, determining whether a tone signaling pattern is carried in the arriving data stream.

9. Apparatus as claimed in claim 8, wherein the coder codes the detected tone signal into the frame by setting a bad frame indicator bit (BFI) of the frame to indicate a bad frame.

10. Apparatus as claimed in claim 9, wherein the coder further codes the detected tone signal into the frame by setting first n bits of a data field of the frame to a predetermined value as a tone signaling header field.

11. Apparatus as claimed in claim 10, wherein the coder further codes the detected tone signal into the frame by coding additional m bits of the data field corresponding to the tone signal or symbol to be carried as a tone signal information field.

12. Apparatus as claimed in claim 11 wherein the coder further provides, in the frame:

d. CRC or parity protection bits for the tone signal information field.

13. Apparatus as claimed in claim 12, wherein the CRC or parity protection bits are located directly after the bits of the tone signal information field.

14. Apparatus as claimed in claim 8, wherein the coder is operable to code the detected tone signal into spare bits of the frame.

15. Apparatus as claimed in claim 8, wherein each marked frame is transported through the GCME link twice by the apparatus.

16. Apparatus for transporting tone signaling information through a GSM Circuit Multiplication Equipment (GCME) link in a Global System for Mobile Communications (GSM) network supporting Tandem Free Operation (TFO) and speech compression modes for the passage of signals through the link, respectively using TFO frames and TRAU-like frames, the apparatus comprising:

a detector arranged in a data stream to a local entrance to the GCME link, operable to detect a tone signal to be transported, a coder which is operable to code the detected tone signal into bits of a TFO or TRAU-like frame for sending through the GCME link, including setting bits to mark the frame as containing tone signaling information by setting a bad frame indicator bit (BFI) of the frame to indicate a bad frame and by setting first n bits of a data field of the frame to a predetermined value as a tone signaling header field and setting bits to identify the detected tone signal, whereby the tone signaling information is transported in-band through the GCME link as a marked TFO or Transcoder and Rate Adaptation Unit-like (TRAU-like) frame, and a detector, at a remote exit from the GCME link, operable to detect the marked frame and to regenerate the tone signal in dependence upon the bits of the marked frame.

* * * * *